INVENTOR.
ALAN O. SYKES

INVENTOR.
ALAN O. SYKES
BY *[signature]*
ATTY.

INVENTOR.
ALAN O. SYKES.
BY
ATTY.

United States Patent Office 3,304,534
Patented Feb. 14, 1967

3,304,534
MULTIPURPOSE PIEZOELECTRIC TRANSDUCER
SYSTEM
Alan O. Sykes, Fairfax County, Va.
(304 Mashie Drive, Vienna, Va. 22180)
Original application Feb. 27, 1963, Ser. No. 261,549.
Divided and this application Aug. 16, 1965, Ser. No. 489,455
10 Claims. (Cl. 340—10)

The invention described herein may be manufactured and used by or for the Government of the United States of America for governmental purposes without the payment of any royalties thereon or therefor.

The present application is a divisional application of applicant's copending application Serial No. 261,549, filed February 27, 1963.

The invention relates to a transducing system and more particularly to a piezoelectric transducing system capable of providing accurate measurements of several different parameters and pairs of certain parameters simultaneously.

Heretofore, transducer measuring systems and devices have been limited to a single measurement capability or have been inaccurate under unfavorable measuring conditions. For example, one system may be provided for the sole purpose of measuring sound pressure; another separate system, acceleration; yet another system, pressure gradient, and so on. Consequently, in order to provide measurement of several different parameters, several different corresponding systems are required. Moreover, under conditions of high ambient noise and other sources of extraneous signals, accuracy decreases.

A further difficulty corollary with each type of single-parameter measuring system is that while the system transducer is desirably sensitive to acceleration, such a transducer may also be unfortuitously sensitive to sound pressure. Being sensitive to both influences, such systems used in mixed environments such as sea water produce confused and inaccurate measurement data. Further, those sound measuring systems designed to have low sensitivity to acceleration are capable of measuring sound pressure only. Conversely, acceleration measuring systems designed for low sensitivity to sound pressure measure only acceleration.

The present invention provides novel transducers and a transducer system arrangement whereby the above-mentioned prior art difficulties and limitations of measurement are overcome. Briefly, according to an embodiment of the present invention, there is provided novel piezoelectric transducing means for producing two different output parameters. The two different output parameters are processed by means of electronic circuitry so that both outputs provide simultaneous measurement data of different parameters. In another embodiment, circuit means are provided to effect cancelling of one of the outputs so that the fidelity (i.e. signal to noise ratio) of the desired output data is increased. Novel circuit means are also provided for increasing the accuracy of measurement signals including accurate pressure gradients.

Accordingly, it is an object of the present invention to provide a system for simultaneously measuring sound pressure and acceleration, and for simultaneously measuring sound pressure and pressure gradient.

Another object of this invention is to provide a system to measure sound pressure which is insensitive to acceleration and vice versa.

Another object of this invention is to provide a system for measuring acoustic intensity.

Yet another object of the present invention is the provision of a transducer having high acoustic sensitivity.

Another object of this invention is to provide a piezoelectric absolute displacement gage.

Still another object of this invention is the provision of a multipurpose piezoelectric transducer measuring system of improved novel design capable of withstanding high static pressures and suitable for use as a microphone or hydrophone.

Another object of this invention is to provide increased accuracy of transducer measurements by means of novel signal processing circuitry.

The foregoing and other objects, features and advantages of the present invention will be better understood by referring to the accompanying drawings in which.

Figure 1:
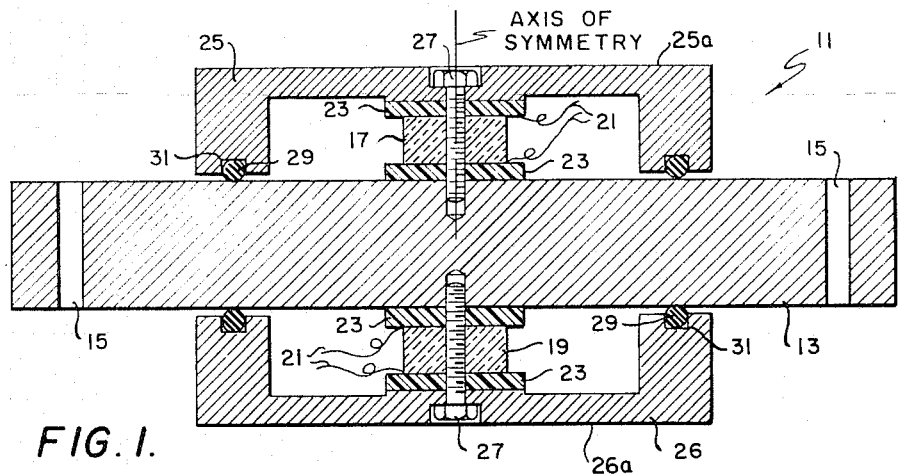
FIGS. 1–7 and 12 are views in cross section of various illustrative embodiments of piezoelectric transducers according to the invention.

Referring to the drawings in which like reference numerals indicate like parts, there is illustrated in FIG. 1 a cross sectional view of a cylindrically symmetric transducer 11 having a heavy metallic central mounting disc 13. The mounting disc 13 has holes 15 for attaching the transducer 11 rigidly to a test specimen. A pair of piezoelectric discs 17 and 19, each with an electrode such as a conductive coating on each of their flat surfaces, are separated from each other by glass insulating discs 23 which are mounted on opposite sides of the central mounting disc 13.

The transducer 11 is further formed of a pair of opposing, identical, rigid, cylindrical, metallic housings 25 and 26. The housings 25–26 each have stiff, flat end portions 25a and 26a effectively in vibrating contact with the crystals 17 and 19. Each flat end portion has a large surface area compared with the surface area of its adjacent piezoelectric crystal element. Each housing is secured to the central mounting disc 13 by means of soft screws 27 extending through the discs 23 and piezoelectric elements and secured into the central mounting disc 13. The screws 27 may be made of nylon, and they have negligible stiffness compared with that of the piezoelectric elements 17 and 19. A watertight seal for the transducer 11 is provided by O-rings 29 of stiffness small compared with the piezoelectric elements and seated in annular grooves 31 in the opposed housings 25 and 26 so that when the screws 27 are brought home, the O-rings are squeezed between the housings 25 and 26, and the central mounting disc 13. The O-rings are preferably positioned as far outward from the axis of symmetry as possible to enhance stress multiplying effects of the housings 25, 26 on the crystal elements 17 and 19.

Each of the leads 21 has an electrode such as a conductive coating on the flat surfaces of the respective piezoelectric discs 17 and 19. Each lead 21 passes watertightly through the housings 25 and 26 of the transducer for connection to the novel signal processing equipment according to the invention.

The two piezoelectric elements 17 and 19 are closely matched to provide equal capacity and equal piezoelectric constant. The transducer of the invention has an acoustic sensitivity much greater than the sensitivity attributable to the acoustic sensitivities of the piezoelectric elements 17 and 19 alone. Stress multiplication is provided by virture of the vibration contact of the large area flat end portions of the housings 25 and 26 with the smaller surface areas of the piezoelectric elements. Specifically, the stress appearing on each respective flat surface of the piezoelectric elements 17 and 19 at measurement frequencies of interest is equal to the applied acoustic pressure multiplied by the ratio of the area of the outer surface of one housing to the projected area of one surface of one of the piezoelectric elements on a plane perpendicular to the axis of symmetry, i.e. a plane perpendicular to the end portions of the housings 25 and 26 and to the flat surfaces of the piezoelectric elements 17 and 19.

When the transducer 11 is placed in a sound field of frequencies having wavelengths much larger than the thickness of the transducer measured parallel to its axis of symmetry, both piezoelectric elements 17 and 19 will experience stresses of the same sign. That is, both will be simultaneously in tension or compression. However, when excited by vibrations of the central mounted disc 13 parallel to the axis of symmetry, the piezoelectric elements experience stresses of opposite sign.

Since the sign of the electric signals generated by the piezoelectric elements is determined by the sign of the stress, it is therefore possible to combine the two voltages in such fashion that they add for an applied sound pressure and subtract for an applied vibration, or vice versa.

Thus, both sound pressure and acceleration or displacement due to vibration can be obtained with the same transducer if the outputs of the two piezoelectric elements 17 and 19 are both added and subtracted. To accomplish this, it is necessary that the capacities and piezoelectric constants of the two elements 17 and 19 be equal. Any slight variations in the piezoelectric constants may be further compensated for by electrical means, and variations in capacity may be corrected by adjusting the size of the piezoelectric elements or by means of trimming capacitors.

Figure 8:
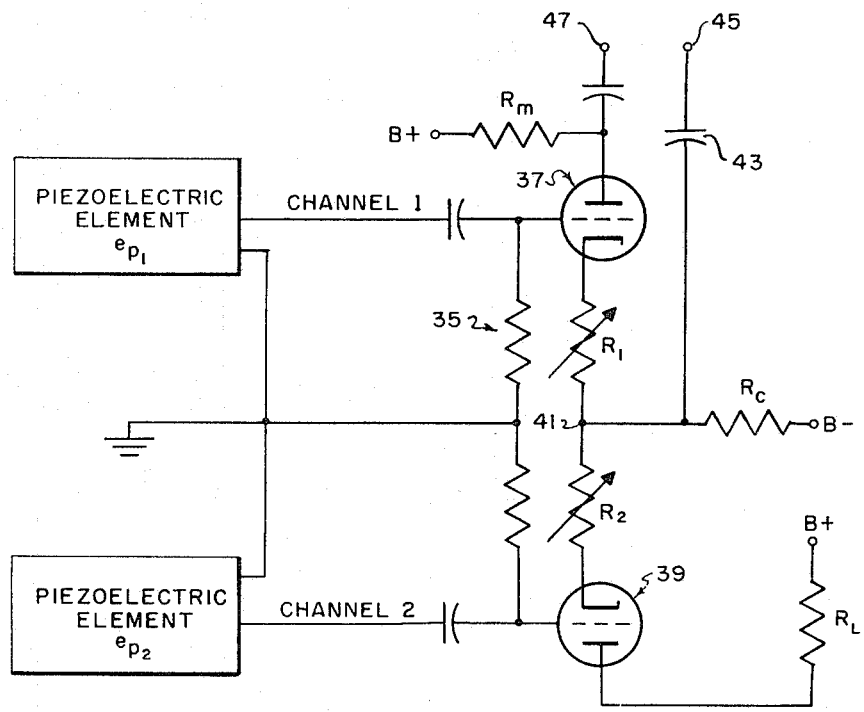
FIG. 8 is a schematic diagram of a transducer measuring system according to an embodiment of the present invention.

Referring to FIG. 8, there is provided as shown therein an electronic circuit for equalizing the sensitivities of the two piezoelectric elements 17 and 19 to provide cancellation of signals due to extraneous influences. The circuit of FIG. 8 may also simultaneously produce signals proportional to the sum and difference of two respective input signals $ep_1$ and $ep_2$ produced by the piezoelectric elements 17 and 19.

The circuit of FIG. 8 includes channel 1 and channel 2 input paths for receiving signals $ep_1$ and $ep_2$ respectively from the piezoelectric elements 17 and 19 when excited. The signals $ep_1$ and $ep_2$ are passed through an impedance matching R/C network 35, and are then fed to respective grids of a pair of matched triodes 37 and 39.

Because there may be inequalities in the piezoelectric constants of the two piezoelectric elements 17 and 19, gain adjusting means are provided to balance channels 1 and 2. For example, $e_{P_1}$ may unfortuitously exceed $ep_2$ in magnitude when $ep_1$ and $ep_2$ are in phase due to excitation from a common stimulus.

The gain adjusting means include a pair of variable resistances $R_1$ and $R_2$ connecting the cathodes of the respective triodes 37 and 39 to a common junction 41. The junction 41 is connected through a resistance $R_C$ to a source of negative reference voltage, B—, and through a capacitor 43 to an output terminal 45.

The remainder of the circuit includes a source of positime reference voltage B+ connected through a resistance $R_m$ to the plate of triode 39 and through a resistance $R_L$ to the plate of triode 37. An output terminal 47 is connected to the plate of triode 37 in parallel with said source of B+.

When the unequal in-phase signals $ep_1$ and $ep_2$ are applied to the grids of the respective triodes 37 and 39, the resistance $R_2$ may be adjusted so that the current flowing through $R_m$ is zero.

If now the leads 21 to one of the piezoelectric elements are reversed so that the two signals $ep_1$ and $ep_2$ are 180° out of phase, with their magnitudes unchanged, $R_1$ may be adjusted so that the current flowing through $R_c$ is zero.

For convenience, the channel 1 and 2 signals respectively may be designated as $$e_{\Sigma_1}=e_{p_1}+e_{a_1} \text{ and } e_{\Sigma_2}=e_{p_2}-e_{a_2}$$

where $e_{P_1}$ is the sound pressure signal of piezoelectric element 17, $e_{P_2}$ is the sound pressure signal of element 19.

The conditions necessary for accurate measurement of the pressure gradient are:

$$\frac{\omega \Delta r}{2c} \ll 1; \frac{\Delta r}{r} \ll 1$$

where $c$ is the speed of sound waves in the medium, $r$ is the distance from the source of sound waves to the pickup or transducer 11, $\omega=2\pi f$, $f$ being frequency, and $\Delta r$ is the distance between the two piezoelectric elements such as 17 and 19.

If $p_1$ is the pressure measured at $r$, $Sp$ is the pressure sensitivity of the transducer at $r$ and $r+\Delta r$, $\Delta r$ being the distance between the two piezoelectric elements, and $ep_2-ep_1$ is the difference in voltage phasors of the signals from the piezoelectric elements 17 and 19, then, under the foregoing conditions, it can be shown that $$e_{p_2}-e_{p_1}=\Delta r S_p \frac{dp}{dr}$$

and $$\frac{dp_1}{dr}=\frac{1}{\Delta r}(e_{p_2}-e_{p_1})/S_p \tag{3}$$

Figure 9:
FIG. 9 is an explanatory block diagram illustrating particle velocity measurement.

Under the same foregoing conditions, the particle velocity $U_1$ at the distance $r$ may be obtained by integrating the difference signal $ep_2-ep_1$ as shown in FIG. 9. Any suitable integrating circuit 55 having a gain of A and a time constant RC may be employed. The output $e_0$ of the integrator 55 is:

$$e_0=\frac{(e_{p_2}-e_{p_1})A}{i\omega RC} \tag{4}$$

The particle velocity $U_1$ can be shown to be:

$$U_1=\frac{1}{pc}\left[\frac{\frac{1\omega r}{c}+1}{\frac{1\omega r}{c}}\right]P_1 \tag{5}$$

($sc$ being the acoustic resistance of the medium).
It can be shown that:

$$e_0=-A\frac{\Delta r}{RC}pS_pU_1 \tag{6}$$

Therefore, the particle velocity is given by $$U_1=-\frac{RCe_0}{\Delta rpS_pA}=-\frac{1}{pSp}\frac{RC}{\Delta r}\frac{e_0}{A} \tag{7}$$

To make possible accurate measurements of pressure gradient when the conditions above are not satisfied, further, signal processing is necessary. This signal processing is carried out by the novel circuit arrangement according to the invention shown in FIG. 10 in block diagram form. The arrangement of FIG. 10 shows a signal processing circuit for obtaining the pressure gradient and particle velocity under the less restrictive conditions where $$\left(\frac{\omega \Delta r}{c}\right)^2 \ll 1$$

That is, for example, where the piezoelectric elements are further apart and the source is closer to the transducers. Under these conditions, it can be shown that the difference in voltage phasors, $$e_{p_2}-e_{p_1}=$$
$$\frac{-\Delta r}{1+\frac{\Delta r}{r}}S_pP_1\left\{i\left[\frac{\omega}{c}-\frac{(\Delta r)^2}{6}\left(\frac{\omega}{c}\right)^3\right]+\frac{1}{r}+\frac{\Delta r}{2}\left(\frac{\omega}{c}\right)^2\right\}=e_a \quad (8)$$

Figure 10:
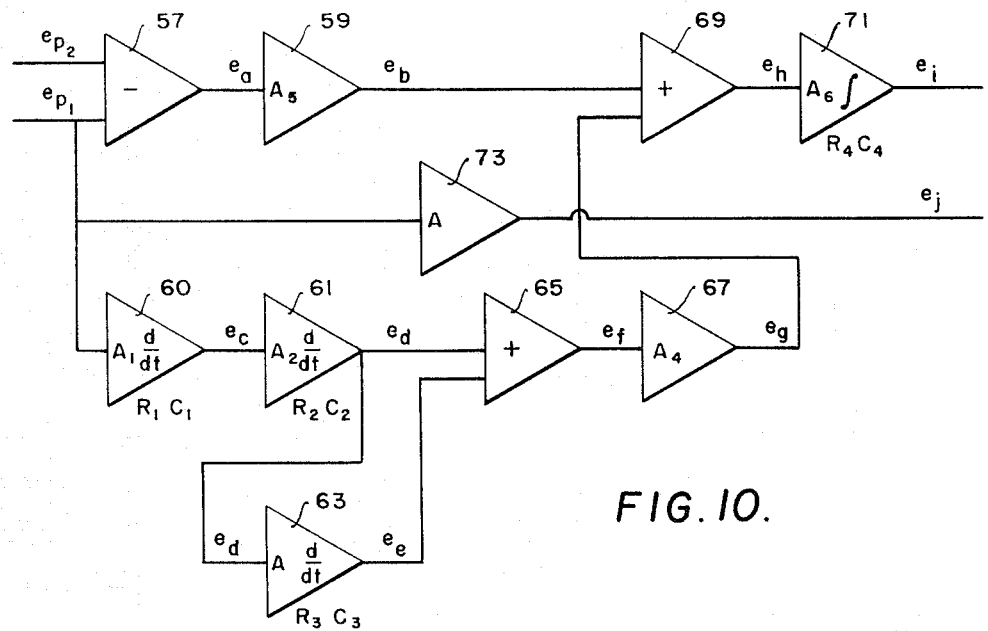
FIG. 10 is a schematic block diagram of an embodiment incorporating improved circuit means according to the invention for providing accurate measurements.

As shown in FIG. 10, the signals $ep_1$ and $ep_2$ are both fed to a subtracting circuit 57 of any suitable design to produce the output $ep_2-ep_1$. To obtain an output signal accurately proportional to the pressure gradient, the second and third order terms of Equation 8, $$\frac{(\Delta r)^2}{6}\left(\frac{\omega}{c}\right)^3$$

and $$\frac{\Delta r}{2}\left(\frac{\omega}{c}\right)^2$$

which lead to considerable error in the output signal, must be eliminated. To accomplish this, the following mathematical steps are carried out by the following corresponding elements of the circuit of FIG. 10.

In an amplifier 59 having a gain $$A5=1+\frac{\Delta r}{r}$$

receiving the input $e_a$, the term $$\frac{1}{1+\frac{\Delta r}{r}}$$

is eliminated from the right side of Equation 8 to produce an ouput $e_b$. Thus, $$e_b=-\Delta r e_{p_1}\left\{i\left[\frac{\omega}{c}-\frac{(\Delta r)^2}{6}\left(\frac{\omega}{c}\right)^3\right]+\frac{1}{r}+\frac{\Delta r}{2}\left(\frac{\omega}{c}\right)^2\right\} \quad (9)$$

The signal $e_{p_1}$ is fed to a differentiating amplifier 60 having an $R_1C_1$ time constant and a gain of $A_1$ to produce an output signal $e_c$. Thus, $$e_c=i\omega e_{p_1}A_1R_1C_1 \quad (10)$$

The signal $e_c$ is fed to a second differentiating amplifier 61 having a gain of $A_2$ and a time constant of $R_2C_2$ to produce an output $e_d$.

$$e_d=\frac{de_c}{d+}=-\omega^2 e_{p_1}A_1R_1C_1A_2R_2C_2$$

or $$e_d=-\frac{\omega^2}{1}e_{p_1}\left(\frac{\Delta r}{c}\right)^2 \quad (11)$$

The gains $A_1$, $A_2$ and associated time constants are related thus:

$$A_1A_2R_1C_1R_2C_2=\tfrac{1}{2}\left(\frac{\Delta r}{c}\right)^2$$

The signal $e_d$ is differentiated at differentiating amplifier 63 having a gain of $A_3$ and a time constant of $R_3C_3$, producing $e_e$ so that where $A_3=\frac{1}{3R_3}C_3\frac{\Delta r}{c}e^{i\pi}$ $$e_e=\frac{i}{6}\left(\frac{\omega\Delta r}{c}\right)^3 e_{p_1} \quad (12)$$

A signal $e_f$ is produced at a summation device 65 of any suitable design by taking the sum of the signals $e_d$ and $e_e$ applied thereto. Thus, $$e_f=-\frac{\omega^2}{2}e_{p_1}\left(\frac{\Delta r}{c}\right)^2+i\frac{\omega^3}{6}e_{p_1}\left(\frac{\Delta r}{c}\right) \quad (13)$$

The signal $e_f$ is fed to an amplifying device 67 of any suitable design and having a gain of $A_4=e^i$ to produce a signal $e_g$ so that $$e_g=\frac{(\Delta r)^2}{2}\left(\frac{\omega}{c}\right)^2 e_{p_1}-i\frac{(\Delta r)^3}{6}\left(\frac{\omega}{c}\right)^3 e_{p_1} \quad (14)$$

It is seen that the signal $e_g$ possesses the terms to be eliminated—

$$i\frac{(\Delta r)^2}{6}\left(\frac{\omega}{c}\right)^3, \frac{\Delta r}{2}\left(\frac{\omega}{c}\right)^2$$

By additively combining the signals $e_g$ and $e_b$ to produce an output signal $e_h$, the undesired terms leading to measurement inaccuracies are eliminated. A summation device 69 of any suitable design additively combines the signals $e_g$ and $e_b$ to produce an output $e_h$. Thus, $$e_h=-\Delta r e_{p_1}\left[i\frac{\omega}{c}+\frac{1}{r}\right] \quad (15)$$

By integrating the $e_h$ signal in a suitable integrating device 71 having a gain of $A_6$ and a time constant of $R_4C_4$, the following output signal $e_i$ is obtained.

$$e_i=\frac{-\Delta r e_{p_1}A_6}{i\omega R_4C_4}\left[i\frac{\omega}{c}+\frac{1}{r}\right] \quad (16)$$

$e_{a_1}$ is the acceleration signal of element 17, and $e_{a_2}$ is the acceleration signal of element 19.

With the resistances $R_1$ and $R_2$ adjusted, and with each piezoelectric element being subjected to both sound pressure through the housings and acceleration (vibration) through the central mounting disc, a signal proportional to the acceleration of the central mounting disc will appear across $R_m$ at the output of channel 1, and a signal proportional to the sound pressure will appear across $R_c$. Since by adjustment, $e_{p_1}=e_{p_2}$, and since $e_{a_1}=e_{a_2}$ by adjustment of $R_1$ and $R_2$ (provided the acceleration sensitivities of the transducer elements are equal), there is obtained an acceleration signal:

output across $R_m=[|e_{p_1}|+|e_{a_1}|]_{out}-[|e_{p_1}|-|e_{a_2}|]_{out}=$
$$[|e_{a_1}|+|e_{a_2}|]_{out} \quad (1)$$

and the sound pressure:

output across $R_c[|e_{p_1}|+|e_{a_1}|]_{out}+[|e_{p_2}|-|e_{a_1}|]_{out}=$
$$[|e_{p_1}|+|e_{p_2}|]_{out} \quad (2)$$

Obviously, by performing the adding operation in channel 1 only or the subtracting operation in channel 2 only, either of the two output signals $\Sigma e_p$ or $\Sigma e_a$ is obtained without interference from the other signal.

Under certain conditions, the circuit of FIG. 8 may also be used to obtain both the pressure and pressure gradient. If the transducer 11 is suspended in a sound field and isolated from all vibratory excitation, a pressure sum signal may be obtained from measuring across $R_c$ and a signal proportional to the difference in two pressures experienced by the piezoelectric elements 17 and 19 obtained across $R_m$.

A second output signal, $e_j$, is obtained by amplifying $ep_1$ directly in a suitable device 73 having a gain of $A_7$. Thus $$e_j=A_7 e_{p_1} \quad (17)$$

From Equations 3 and 15, it follows that:

$$e_h=-\Delta r C_{p_1}\left\{\frac{i\omega}{c}+\frac{1}{r}\right\}=-\Delta r S_p P_1\left\{\frac{i\omega}{c}+\frac{1}{r}\right\}=\Delta r S p \frac{dp}{dr} \quad (18)$$

The pressure gradient $dp/dr$ at the distance $r$ is given by $$dp/dr=e_h/\Delta r S_p \quad (19)$$

From Equations 5 and 16

$$e_i = \frac{-\Delta r}{R_4 C_4} e_{p_1} A_6 \left\{ \frac{\frac{i\omega r}{c} + 1}{i\omega r} \right\} = \frac{-\Delta r}{R_4 C_4} PSpA_6 u_1 \quad (20)$$

The particle velocity $u_1$ at $r$ is therefore given by $$u_1 = -\frac{1}{PSp} \frac{R_4 C_4}{\Delta r} \frac{e_i}{A_6} \quad (21)$$

indicating that $u_1$ and $e_i$ are 180° out of phase.

The acoustic intensity I is obtained by $$I = p_1 u_1 \cos \theta \quad (22)$$

where $\theta$ is the phase angle between pressure and velocity.

It follows from Equation 17 that $$P_1 = \frac{e_j}{A_7 Sp} \quad (23)$$

Thus, $P_1$ and $e_j$ are in phase.

Therefore, the acoustic intensity I may be expressed as $$I = \frac{-1}{P(S_p)^2} \frac{R_4 C_4}{\Delta r} \frac{e_i e_j}{A_6 A_7} \cos \theta \quad (24)$$

The present invention affords the measurement of acoustic intensity I by measuring $e_i$, $e_j$ and the phase angle therebetween, and substituting the values therefor in Equation 24 above, and the resulting multiplication may be carried out electronically by any suitable well known means.

In measuring pressure gradient it is essential that the bulk of the transducer weight be concentrated in the center disc mounting 13 which should be at least several times heavier than the total weight of all other components of the transducer 11. If the disc 13 were to have no mass, the difference signal $ep_2 - ep_1$ would unfortuitously be zero.

Figure 3:
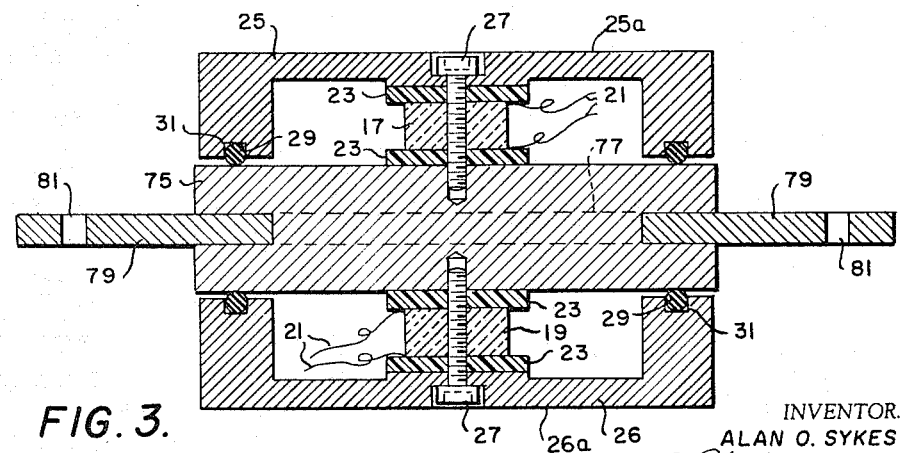
Figure 4:
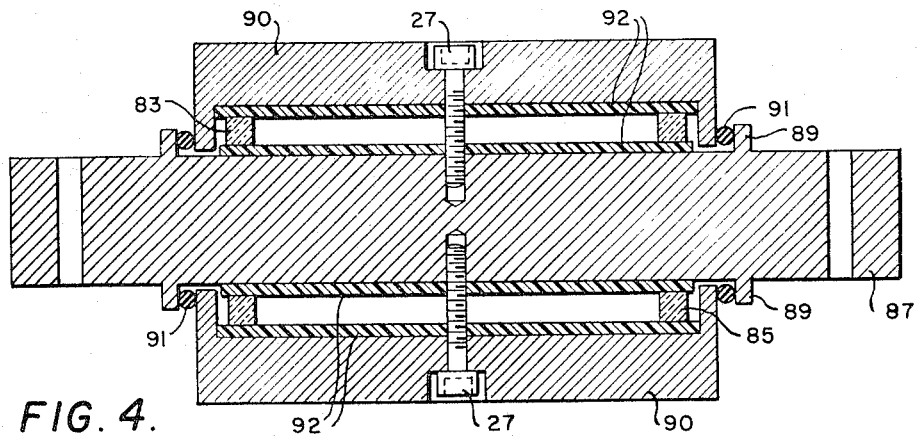
Figure 6:
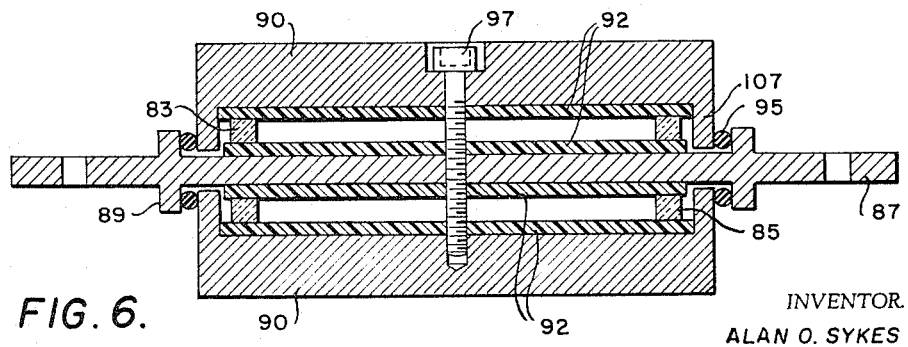

Reference is now made to FIGS. 3, 4 and 6 which illustrate various embodiments of the transducer having a relatively heavy central mounting pieces similar to the heavy central mounting disc 13 of FIG. 1.

The transducer of FIG. 3 is provided with transducer isolation means. Unlike the transducer shown in FIG. 1, that of FIG. 3 has central mounting piece in the form of a thick disc 75 coextensive with the housings 25, 26 and suitably sealed thereto by O-rings 29. The disc 75 has a peripheral groove 77 for receiving an flat annular flexible diaphragm 79 having mounting holes 81. The diaphragm 79 effectively isolates the transducer from local vibrations. The natural frequency of the transducer of FIG. 3 is much lower than that of FIG. 1, and thus does not respond to acceleration forces at frequencies which are much lower than the lowest frequency of interest for measurement purposes. Consequently the transducer of FIG. 3 is especially useful for measuring sound pressure gradients and sound pressure in an unfavorable environment. Also, by virtue of the isolation and if properly connected, it can be used as a piezoelectric absolute displacement gage.

The transducer embodiment of FIG. 4 includes a pair of annular piezoelectric elements 83 and 85 opposingly supported by a heavy central mounting disc 87. The disc 87 has a pair of opposed shoulders 89 spaced from a pair of identical opposing transducer housings 90 so that O-rings 91 may be squeezed between the shoulders 89 and the identical housings 90 to provide a seal. The elements 83 and 85 are insulated from the disc 87 and housings 90 by thin insulating discs 92. The transducer of FIG. 4 is similar in operational advantages to that of FIG. 1, and the remaining elements of the FIG. 4 transducer have the same purpose as the correspondingly designated structural elements of the transducer of FIG. 1. The transducer of FIGS. 1 and 4 are both particularly useful as accelerometers.

The transducer embodiment of FIG. 6 is very similar to that of FIG. 4 except central mounting disc 87 is thinner for a different frequency sensitivity. A single screw 97 secures together identical transducer housings 90 and the remaining intervening transducer elements. Instead of an O-ring seal, the sealing of the transducer of FIG. 6 is carried out by means of compliant sealing elements 95 which are suitably bonded to opposing surfaces of the shoulders 89 and the housings 90.

Figure 2:
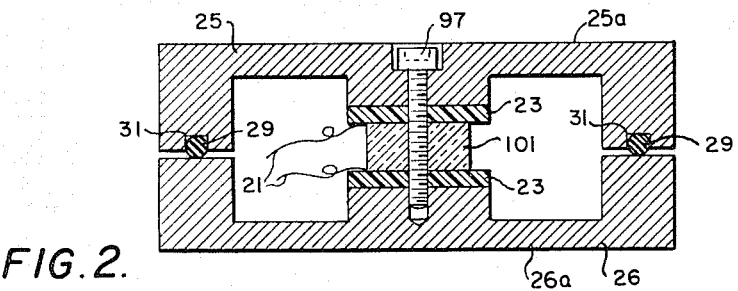
Figure 5:
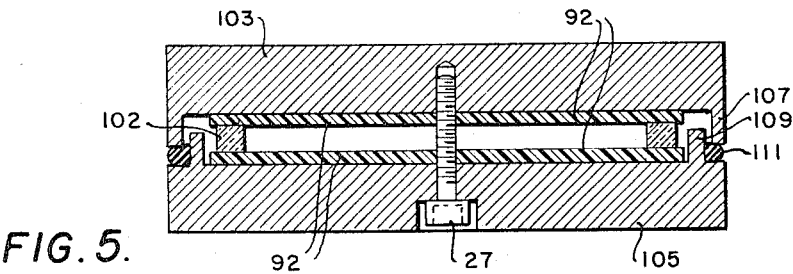

The transducers of this invention as embodied in FIGS. 2 and 5 employ only a single piezoelectric element and are not provided with a heavy central mounting disc such as element 13 of FIG. 1. In FIG. 2 a single screw 97 secures together the transducer housings 25, 26 in squeezing relationship against an O-ring 29 and a single disc-shaped piezoelectric element 101.

The transducer of FIG. 5 has an annular piezoelectric element 102 and further includes a pair of opposed thick disc like housings 103 and 105. The housing 103 has thin, short peripheral cylindrical wall 107 extending toward the housing 105. The housing 105 has an inner annular shoulder 109 extending toward housing 103 and juxtaposed to the cylindrical wall 107. The transducer of FIG. 5 is sealed with a compliant seal such as rubber or polyurethane bonded to the wall 107 and to the shoulder 109.

Figure 7:
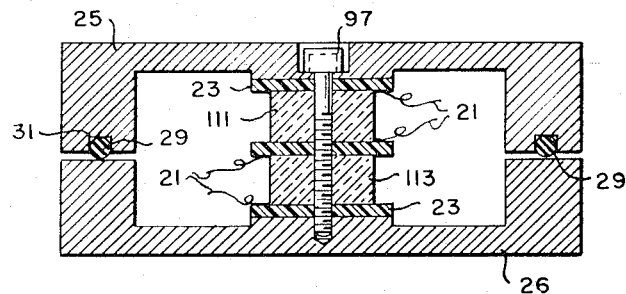

In FIG. 7 another embodiment of the transducer similar to those of FIGS. 2 and 5 is shown having two piezoelectric elements 111 and 113 in the form of discs. The elements 111 and 113 are insulatedly separated from each other and from the housings by discs 23 made of suitable insulating material such as a hard plastic or glass. The transducer of FIG. 7 is otherwise assembled in the same manner as that of FIG. 2.

Figure 12:
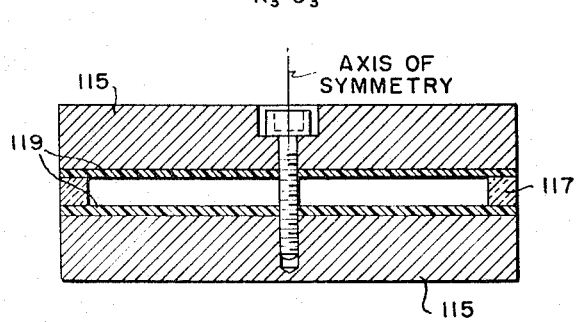

Referring to FIG. 12, there is shown yet another embodiment of a transducer wherein the O-rings or compliant sealing means are eliminated. The transducer of FIG. 12 is provided with a pair of rigid identical flat cylindrical (or square or rectangular) housing members 115 which are flat on all surfaces perpendicular to the axis of symmetry. An annular or perimetrical piezoelectric crystal element 117 having electrically conductive coatings thereon is suitably welded or bonded in a stiff manner to each of a pair of glass insulating elements 119. Suitable leads (not shown) are provided for by the crystal elements. The insulating elements 119 are suitably bonded to the housings 115. Although the insulating elements of FIG. 12 are illustrated as extending completely across the extent of the transducer, alternatively the insulating elements may obviously be of even dimension and shape with the piezoelectric element 117. This applies to the other illustrated embodiments as well. A nylon or other soft screw 121 extends along the axis of symmetry to further press the transducer elements together.

The transducer of FIG. 12, assembled as explained above, is then immersed in a suitable compliant sealing compound and the compound allowed to harden. The result is a completely sealed transducer unit suitable for underwater use and capable of withstanding high static pressure. Moreover, the elimination of discrete sealing means even further decreases any measurement errors due to the interaction of forces between resilient sealing means and inertia of water being displaced.

The transducers embodied in FIGS. 2, 5 and 7 are particularly useful where vibration (acceleration) measurements are not required, such as for sound pressure measurements alone.

The transducers of FIGS. 1 and 4 are particularly useful as piezoelectric accelerometers, while those of FIGS. 3 and 6 are intended for use as piezoelectric displacement gages in that they are resiliently damped or spring mounted. Of course, they can also measure both sound pressure and displacement simultaneously or just sound pressure alone.

Figure 11:
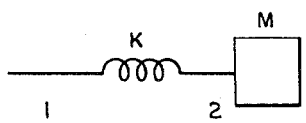
FIG. 11 is an explanatory diagram illustrating the principles of an embodiment of the invention in connection with use thereof as an absolute displacement gage.

Measurement of piezoelectric displacement may be carried out in the following manner. Referring to FIG. 11, a simple mass-spring system is diagrammatically shown with a spring with spring constant K and a mass M representatively positioned at terminals 1 and 2.

If there be applied at terminal 1 a vibratory displacement $$X_1 = X_{01} e^{iwt} \qquad (25)$$

it can be shown that the ratio of the displacement phasor $X_{02}$ at terminal 2 to the displacement phasor $X_{01}$ at terminal 1 is $$\frac{X_{02}}{X_{01}} = \frac{1}{1-\left(\frac{W}{W_0}\right)^2} \qquad (26)$$

where $W_0^2 = K/M$ and $-W^2 X_{02}$ is the acceleration of the mass M. It follows from Equation 26 that $$X_{01} \cong \frac{1}{\omega_0^2}[-\omega^2 X_{02}] \overset{\text{def}}{=} \frac{1}{\omega_0^2}\ddot{X}_{02} \qquad (27)$$

As an accelerometer, the transducer of FIGS. 3 and 6 will produce an output $$e_{\ddot{x}}$$

such that $$e_{\ddot{x}} = S_{\ddot{x}} \ddot{x}_{02} \qquad (28)$$

where $$S_{\ddot{x}}$$

is the sensitivity of the accelerometer in volts per unit of acceleration.

Substituting $$X_{02}$$

from Equation 28 into Equation 27, $$X_{01} = \frac{1}{W_0^2} \frac{e_{\ddot{x}}}{S_{\ddot{x}}} \qquad (29)$$

Thus, the sensitivity $S_x$ of the spring-mounted accelerometer as a displacement gage is $$S_x = \omega_0^2 S_{\ddot{x}} = \frac{K}{M} S_{\ddot{x}} \qquad (30)$$

The transducers of FIGS. 3 and 6 accomplish double integration effectively and thus act as absolute displacement gages in addition to being employed as sound pressure cancelling displacement gages, or gages from which both the displacement and sound pressure can be obtained. The foregoing displacement provides measurements relative to an inertial frame of reference, not a fixed point in space.

It is to be understood that the transducer system of the present invention provides sound pressure information relatively uninfluenced by motion of the transducer, or displacement or acceleration information relatively uninfluenced by the pressure of sound field; or it can provide both, either displacement or acceleration, and sound pressure information simultaneously. The transducers themselves need not be cylindrically symmetrical, but may alternatively be square or rectangular or some other shape having an axis of symmetry.

Moreover, the system of the present invention provides sound pressure and sound pressure gradient information simultaneously at essentially the same point in space, or sound pressure and particle velocity information $U_1$ from which the acoustic intensity I can be calculated.

Obviously many modifications and variations of the present invention are possible in the light of the above teachings. It is therefore to be understood that within the scope of the appended claims the invention may be practiced otherwise than as specifically described.

What is claimed is:

1. A transducer system for providing an output signal representing accurate measurement of input signal parameters under conditions which would normally lead to inaccuracies due to presence of second and third order error terms in the transducer output signals, comprising;

transducer means having first and second piezoelectric elements mounted for response to input signal parameters at least one of which is sound pressure to produce outputs represented by voltage phasors $e_{p_1}$ and $e_{p_2}$ respectively;

the signal difference between voltage phasors $e_{p_2}$ and $e_{p_1}$ of the respective output signals of the piezoelectric elements having second and third order signal error components herein;

means for subtracting one said voltage phasor from the other thereby producing said signal error components in the signal $e_{p_2} - e_{p_1}$;

signal processing means for deriving from said one voltage phasor said signal error components;

and means for algebraically combining the subtracted signals with said one voltage phasor derived signal containing said signal error components to thereby eliminate said signal error components from the subtracted signals $e_{p_2} - e_{p_1}$.

2. The system as defined according to claim 1 but further characterized by said transducer means comprising:

a pair of sound-pressure responsive housings each having a flat rigid end portion in insulated vibrating contact with one flat surface of a corresponding one of said piezoelectric elements; the area of said flat end portion being greater than the opposing surface area of the corresponding piezoelectric element;

a central mass element responsive to vibrations of a different frequency than said housings and located between said housings and between said piezoelectric elements in insulated vibrating contact with the other flat surfaces of said piezoelectri celements;

means for sealably securing said housings toward each other and toward said central mass element to provide a closed and sealed hollow transducer body.

3. The system as defined according to claim 1 but further characterized by said transducer means comprising:

a pair of sound-pressure responsive housings each having a flat rigid end portion in insulated vibrating contact with one flat surface of a corresponding one of said piezoelectric elements, the area of said flat end surface being greater than the opposing flat surface area of the corresponding piezoelectric element to thereby obtain stress multiplication of vibrational movements of said housings through said respective piezoelectric elements;

and means for sealably securing said housings together to form a fluidtight and hollow transducer body.

4. The system as defined according to claim 1 but further characterized by said output signal being sound pressure gradient.

5. The system as defined according to claim 1 but further characterized by integrating means coupled to receive the output of the algebraic combining means for producing an output signal representative of the particle velocity $u_1$ at the transducer location.

6. The system as defined according to claim 1 but further characterized by said signal deriving means including circuit means for amplifying said error signal components, a second circuit means for amplifying said one voltage phasor, whereby an output signal representative of the acoustic intensity I may be obtained.

7. The system as defined according to claim 1 but further characterized by said transducer means comprising vibration isolation mounting means connected to said heavy mass element, whereby the system output signal is representative of absolute displacement.

8. A transducer system for providing an output signal representing accurate measurement of input signal parameters under conditions which would normally lead to inaccuracies due to presence of second and third order error terms in the transducer output signals comprising:

transducer means to produce outputs represented by voltage phasors $e_{p_1}$ and $e_{p_2}$ respectively;

the signal difference between voltage phasors $e_{p_2}$ and $e_{p_1}$ having second and third order signal error components therein;

means for subtracting one said voltage phasor from the other thereby producing said signal error components in the signal $e_{p_2} - e_{p_1}$;

signal processing means for deriving from said one voltage phasor said signal error components;

and means for algebrically combining the subtracted signals with said one voltage phasor derived signal error components to thereby eliminate said signal error components from the subtracted signals $e_{p_2} - e_{p_1}$.

9. The system as defined according to claim 8 but further characterized by integrating means coupled to receive the output of the algebraic combining means for producing an output signal representative of the particle velocity $u_1$ at the transducer location.

10. The system as defined according to claim 8 but further characterized by said signal deriving means including circuit means for amplifying said error signal components, a second circuit means for amplifying said one voltage, whereby an output signal representative of the acoustic intensity $I$ may be obtained.

No references cited.

RODNEY D. BENNETT, *Acting Primary Examiner.*

CHESTER L. JUSTUS, *Examiner.*

B. L. RIBANDO, *Assistant Examiner.*